United States Patent [19]

Laveissiere

[11] Patent Number: 5,419,715

[45] Date of Patent: May 30, 1995

[54] TERMINAL STRIP WITH FLEXIBLE LABELLING FACILITY

[75] Inventor: Gilles Laveissiere, Courbevoie, France

[73] Assignee: Infra+, L'Hay Les Roses, France

[21] Appl. No.: 142,136

[22] Filed: Oct. 28, 1993

[30] Foreign Application Priority Data

Nov. 2, 1992 [FR] France ................... 92 13108

[51] Int. Cl.$^6$ ............................................. H01R 3/00
[52] U.S. Cl. ................................................ 439/491
[58] Field of Search ............... 439/488, 491, 709, 718; 174/112; 200/308, 309

[56] References Cited

U.S. PATENT DOCUMENTS

| | | | |
|---|---|---|---|
| 3,247,480 | 4/1966 | Orzechowski | 439/491 |
| 3,753,216 | 8/1973 | Johnson et al. | 439/491 |
| 4,550,964 | 11/1985 | Donais et al. | 439/491 X |
| 5,080,607 | 1/1992 | Cristescu | 439/491 |

FOREIGN PATENT DOCUMENTS

| | | |
|---|---|---|
| 2665044 | 1/1992 | France . |
| 2033182 | 2/1972 | Germany . |
| 3324652 | 10/1984 | Germany . |
| 3615824 | 11/1986 | Germany . |
| 3929905 | 10/1990 | Germany . |
| 0911303 | 11/1962 | United Kingdom . |
| 8503800 | 8/1985 | WIPO . |

Primary Examiner—Khiem Nguyen

[57] ABSTRACT

A terminal strip has two substantially rectangular, generally planar sides 4, two side faces 5, 6, a front face 7 and a back face 8, and can be fixed to a rail by the back face. The sides are perpendicular to the length of the rail, and the front face includes electrical contacts 3. The terminal strip includes a side labelholder 12 extending over a side face and making an obtuse angle with the front face so that a label carried by the labelholder is visible from the front face of the terminal strip. The side labelholder comprises snap-fasteners 15 at one of its ends cooperating with snap-fastener members 14 on the front face at one of its ends near the side face for removable mounting of the labelholder on the terminal strip.

11 Claims, 3 Drawing Sheets

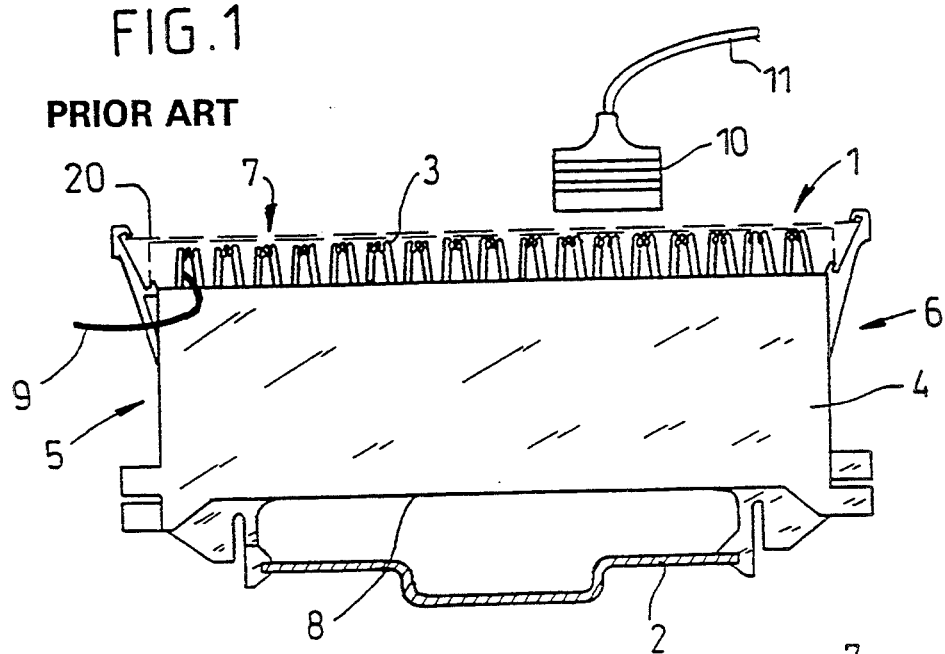
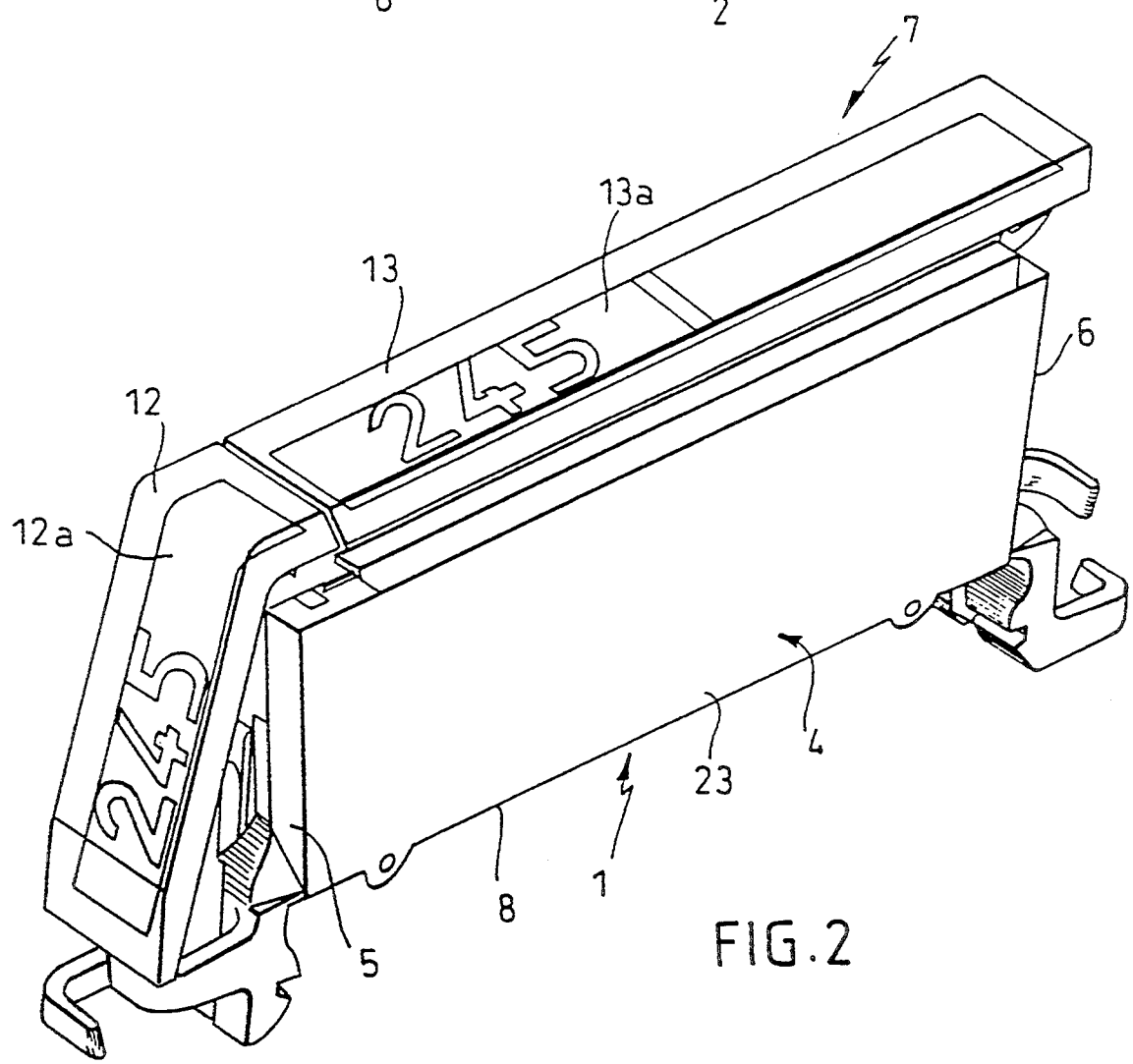

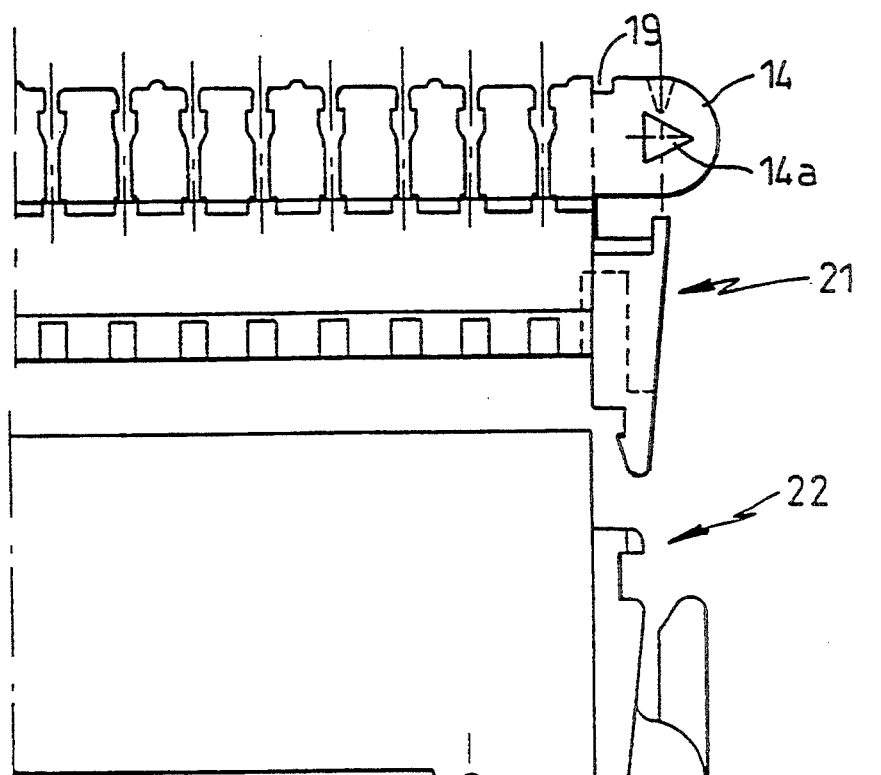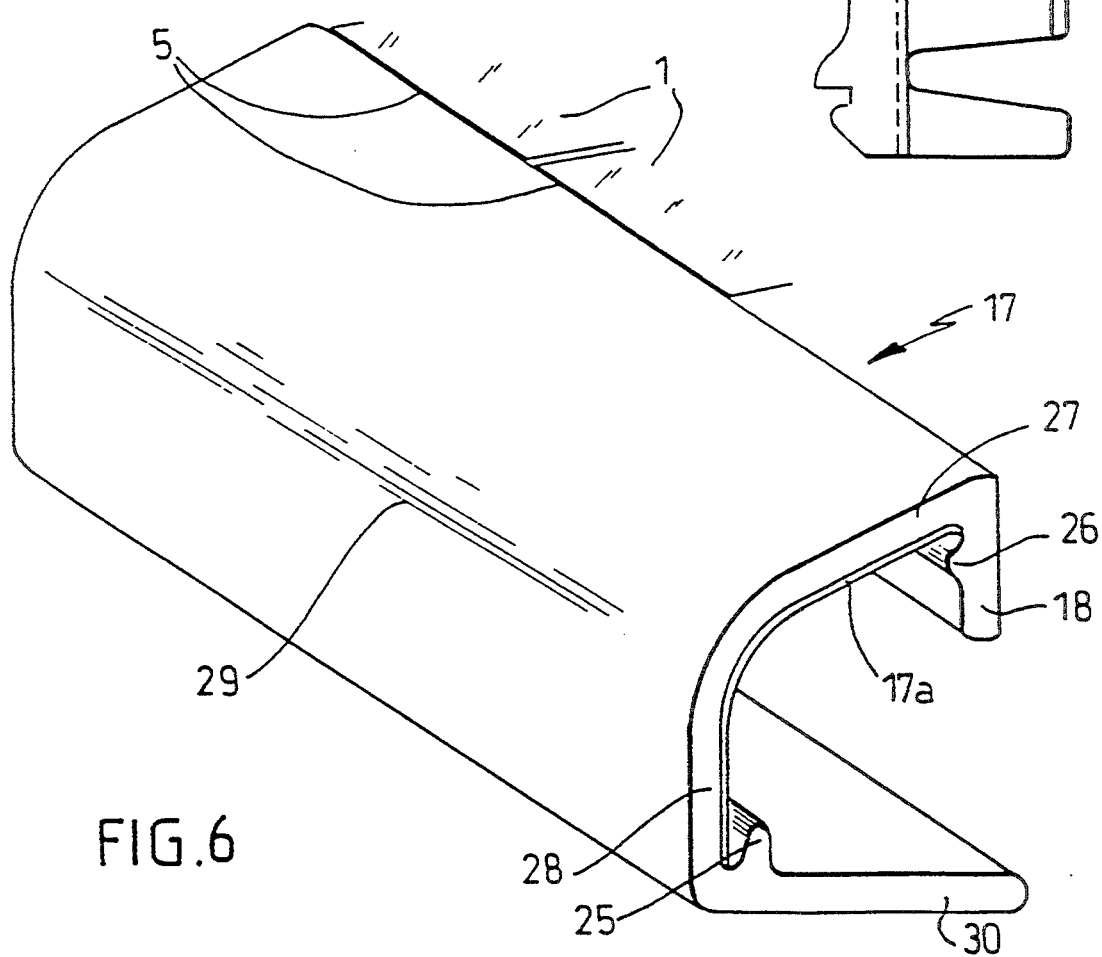

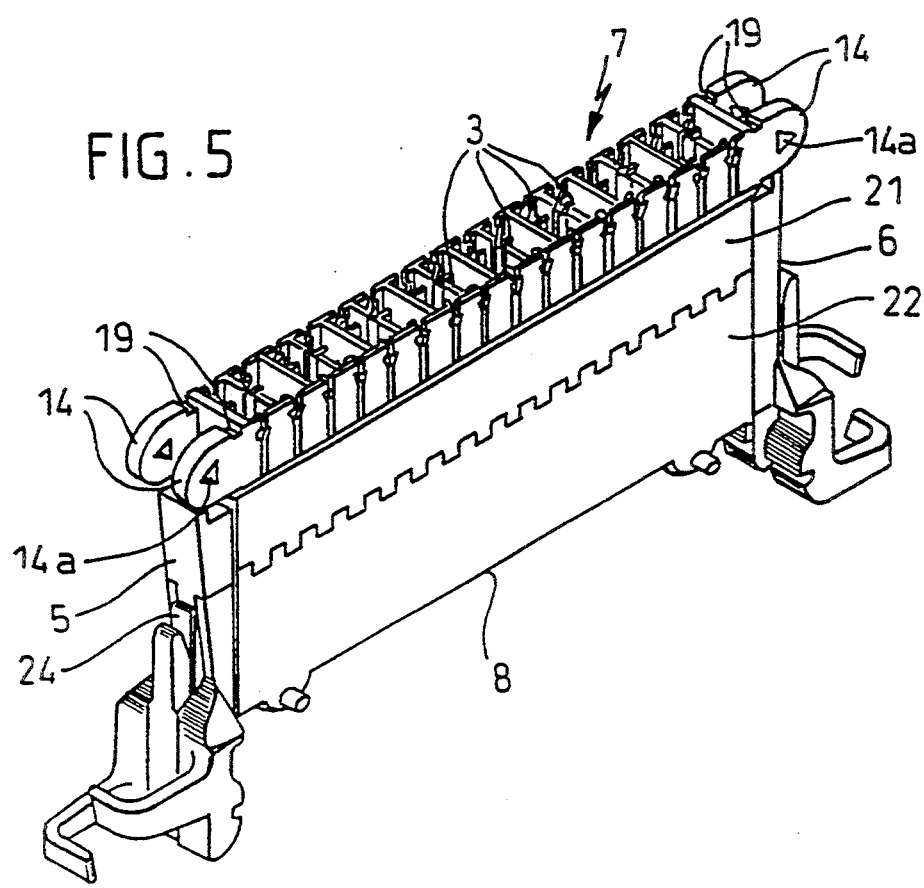
FIG. 5
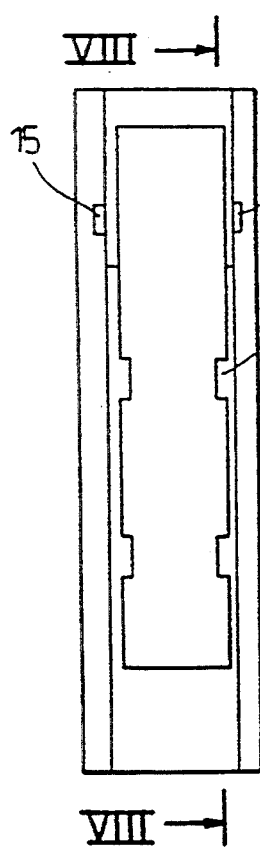
FIG. 7
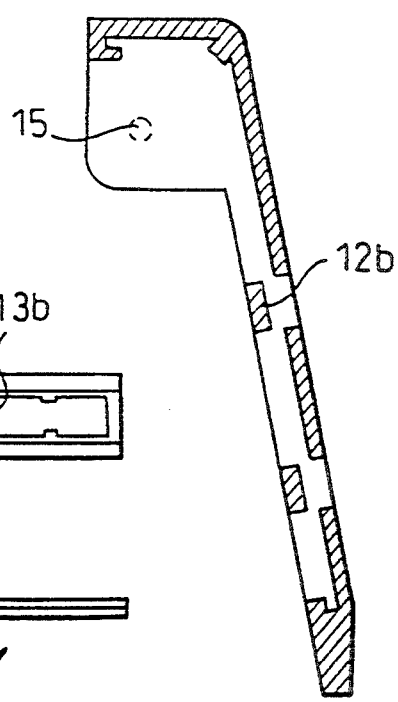
FIG. 8
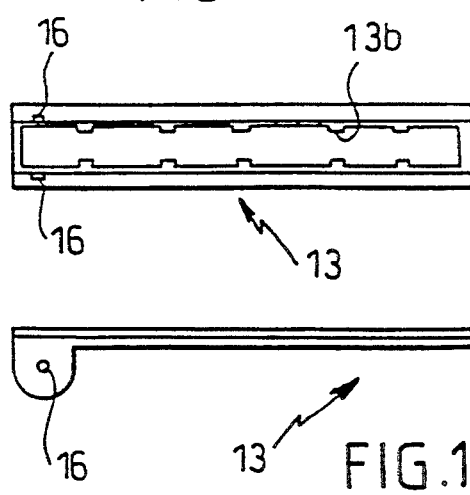
FIG. 9
FIG. 10

TERMINAL STRIP WITH FLEXIBLE LABELLING FACILITY

The present invention concerns a terminal strip with a flexible labelling facility.

BACKGROUND OF THE INVENTION

It is more particularly concerned with a terminal strip for cable terminations as used in distribution frames for telephones, or for business or domestic equipment. A terminal strip of this kind comprises at least one row of contacts connected in the usual way to the conductors of a cable and to jumper links. EP-0 133 824 shows terminal strips of this kind, for example.

As the distribution frames mentioned above may comprise a large number of terminal strips, it is desirable to identify them by means of labels. The terminal strips are usually juxtaposed lengthwise along a mounting rail with only their front faces, containing the contacts, clearly visible. Accordingly, in the prior art terminal strip labels are on a labelholder snap-fastened to the front face of the terminal strip, in front of the contacts.

A technical problem then arises in that the labelholder is compatible only with the connection of individual conductors to the various contacts of the terminal strip, and is incompatible with the connection of connectors to one or more contacts because connectors are too bulky. Consequently, if the terminal strip is connected to jumper links with connectors that connect to the contacts of the terminal strip, then the strip cannot be labelled, which is a nuisance.

OBJECTS AND SUMMARY OF THE INVENTION

PCT patent application No WO-A-8 503 800 discloses a marking device and an electrical component adapted to receive it on its inclined side faces. The marking device disclosed is a substantially U-shaped piece of springy resin adapted to be snapped either onto a cable or onto or between ribs specifically provided for this purpose on the inclined side faces of the electrical connector. The markings comprise symbols such as letters or digits visible on the central part of the U-shape joining the two branches. A series of removable marking devices may be snapped onto each inclined side face of the electrical connector to form an inscription or reference code. Each springy resin member is extruded and then marked with a symbol (letter or digit). A great variety of symbols is therefore required to put together a reference code. The appropriate members must be found one by one and clipped onto the electrical component. This is time-consuming and if any symbol happens to be missing it is impossible to complete the reference code. There is also the ever-present risk of one or more members becoming detached from their support, making it impossible to read the reference code.

According to the invention the above difficulties are solved by a terminal strip having two substantially rectangular generally plane sides, two side faces, a front face and a back face, said terminal strip being adapted to be fixed to a rail by said back face, said sides being perpendicular to the length of said rail, said front face including electrical contacts, said terminal strip including a side labelholder extending over a side face and making an obtuse angle with the front face so that a label carried by said labelholder is visible from the front face of the terminal strip, wherein the side labelholder includes snap-fastener means at one end cooperating with a snap-fastener member on the front face at one of its ends near the side face for removable mounting of said labelholder on the terminal strip.

Another technical problem is that of providing access to the side of the terminal strip carrying the side labelholder, for example to ground a screened cable drain wire, as shown in FR-A-2 650 709, for example, without removing the side labelholder, which might then not be replaced or mixed up with another labelholder.

In an embodiment of the invention, this problem is solved in that the side labelholder substantially covers said side face and can pivot about an axis near the front face and perpendicular to the sides of the terminal strip.

Another technical problem is that of providing for the simultaneous fitting of a side labelholder and a prior art type front labelholder without complicating the construction of the terminal strip.

In an embodiment of the invention, this problem is solved in that the terminal strip includes identical snap-fastener members at both ends of its front face near the side faces, and said terminal strip further includes a front labelholder covering the front face of the terminal strip and having snap-fastener means cooperating with one of the snap-fastener members to mount the front labelholder removably to the terminal strip.

Another technical problem is to enable access to the front face of the terminal strip, for example to connect jumper link conductors to the contacts at the front face, without removing the front face labelholder, which might then not be replaced or which might be mixed up with another labelholder.

In an embodiment of the invention, this technical problem is solved in that the snap-fastener means of the front labelholder cooperate with one of the snap-fastener members to mount the front labelholder so that it can pivot about an axis perpendicular to the sides of the terminal strip.

In an embodiment of the invention each snap-fastener member at each end of the front face has two identical bosses each in the form of a plate extending parallel to the sides of the terminal strip, said bosses forming a bearing on which a front labelholder or side labelholder is pivoted. Each side boss is with advantage elastically deformable perpendicularly to the sides of the terminal strip and has a hole for receiving snap-fastener fashion a pivot on a front labelholder or a side labelholder.

Another technical problem is to provide a side labelholder shared by a plurality of terminal strips.

In an embodiment of the invention this problem is solved in that said side labelholder is a generally channel section bar, the terminal strip comprises a side boss of complementary shape on at least one of its two side faces near the front face, and said side labelholder is snap-fastened to said side boss and extends perpendicularly to the sides of the terminal strip beyond at least one of said sides. Said side boss advantageously includes a notch perpendicular to the sides of the terminal strip and said side labelholder has a complementary rib snap-fastened in said notch.

BRIEF DESCRIPTION OF THE DRAWINGS

Other features and advantages of the invention emerge from the following description of an embodiment of the invention given by way of non-limiting example with reference to the accompanying drawings.

In the drawings:

FIG. 1 is a side view of a prior art terminal strip;

FIG. 2 is a perspective view of a terminal strip in accordance with the invention;

FIGS. 3 and 4 are side views of two component parts of the terminal strip in accordance with the invention;

FIG. 5 is a perspective view of a terminal strip in accordance with the invention;

FIG. 6 is a perspective view of a first side labelholder which can be fitted to the terminal strip in accordance with the invention;

FIG. 7 is a bottom view of a second side labelholder which can be fitted to the terminal strip in accordance with the invention;

FIG. 8 is a cross-section view on line 8—8 in FIG. 7;

FIG. 9 is a bottom view of a front labelholder which can be fitted to the terminal strip in accordance with the present invention, and FIG. 10 is a side view of the front face labelholder from FIG. 9.

MORE DETAILED DESCRIPTION

FIG. 1 shows a prior art type terminal strip. It has two generally rectangular plane sides 4, two side faces 5, 6, a front face 7 and a back face 8. The back face 8 of the terminal strip 1 is snap-fastened to a rail 2, usually a metal rail, and has one or more rows of contacts 3 at the front face, usually insulation displacement type contacts well-known in the state of the art, for example the double insulation displacement contacts disclosed in FR-A-2 664 433. The insulation displacement contacts 3 are connected to the conductors of a cable (not shown) which may be a telephone cable, a data cable, etc. The sides 4 of the terminal strip 1 may advantageously be constituted by flanges with internal guide channels for guiding the various conductors of the cable. The insulation displacement contacts 3 are connected to jumper links, i.e. to conductors for making cross-connections in a telephone, data or other distribution frame. The jumper links may be individual conductors 9 individually inserted into the slots of the insulation displacement contacts 3, or else they may be cables 11 terminated at respective connectors 10 which plug into the insulation displacement contacts 3.

In a telephone or data distribution frame, a large number of terminal strips 1 are snap-fastened in rows to one or more rails 2. The sides 4 of the terminal strips are usually close together or in contact. Because of the large number of terminal strips in a distribution frame, the various terminal strips must be identified by labels. Because of the arrangement of the terminal strips, a labelholder 20 is usually clipped to the terminal strip, covering its front face 7. A labelholder of this kind is compatible with individual conductors 9 fixed to the various insulation displacement contacts but is not compatible with a jumper link comprising a cable 11 and a connector 10, because of their bulk. Thus, if a connector 10 is used at the front face of the terminal strip, the labelholder 20 must be removed and the terminal strip is no longer identified, which is a great nuisance.

FIG. 2 shows a terminal strip in accordance with the present invention which is of generally similar shape to that shown in FIG. 1 and which is not described again in detail. The FIG. 1 reference numbers are used again in FIGS. 2 et seq to denote parts identical or similar to those of FIG. 1.

The terminal strip 1 includes two plastics material central parts 21, 22 shown in FIGS. 3 and 4 which snap together as shown in FIG. 5. It also includes two plastics material side flanges 23 shown in FIG. 2 and forming the sides 4 of the terminal strip. The flanges 23 preferably incorporate internal guide channels (not shown) for the various conductors of a cable connected to the terminal strip 1. Referring to FIG. 5, each side face 5, 6 of the terminal strip carries a quick-action ground contact 24, preferably of the spring clip type, for grounding the drain wire of a screened cable associated with the terminal strip 1. The ground contact 24 is usually in electrical contact with the rail 2, for example through a metal tang (not shown) projecting from the back face 8 of the terminal strip, the metal rail 2 being grounded.

Near the front face 7 of the terminal strip, each side face 5, 6 of the terminal strip also has two bosses 14 projecting laterally outwards. Each boss 14 is near one side 4 of the terminal strip and in the form of a plate parallel to said side 4 of the terminal strip and has a hole 14a in it perpendicular to the sides 4 of the terminal strip. The holes 14a of the two bosses 14 on the same side face of the terminal strip are aligned. The bosses 14 have some elasticity in the direction perpendicular to the sides 4 of the terminal strip and each comprises a notch 19 at the front face 7 of the terminal strip. Said notches 19 of the two bosses 14 on the same side face of the terminal strip are aligned perpendicularly to the sides 4 of the terminal strip.

The terminal strip 1 in accordance with the invention may be fitted with various labelholders. It may be fitted with a front labelholder 13 which may be made from a transparent plastics material and contain one or more labels 13a. As shown in FIGS. 9 and 10 the labelholder 13 has two pivots 16 adapted to snap into the holes 14a of two bosses 14 on one of the side faces of the terminal strip, for example the side face 6. The front labelholder 13 can therefore rotate on the bosses 14 to uncover the front face 7 of the terminal strip when access to it is required, for example to fix or remove a conductor 9 or to test one of the contacts 3, without it being necessary to remove the front labelholder 13 from the terminal strip 1. Referring to FIG. 9, the labelholder 13 has internal retaining members 13b for retaining the label 13a. The labelholder 13 extends to a point near the bosses 14 on the other side face of the terminal strip but does not encroach on said bosses 14 which can therefore receive a side labelholder 12 with a label 12a which may be similar to the label 13a of the front labelholder. The labelholder 12 is shown in FIGS. 7 and 8 and includes two pivots 15 adapted to snap into the holes 14a in the bosses on the side face 5 of the terminal strip. It also includes retaining means 12b which retain the label 12a. In its normal position the labelholder 12 is inclined to the side face 5 so that it diverges from it in the direction away from the front face 7 of the terminal strip. This means that the label 12a is easy to read from in front of the front face 7 of the terminal strip. As the side labelholder 12 can pivot on the bosses 14, it can be turned about the pivots 15 until the label 12a is parallel to the front face 7 of the terminal strip and therefore easier to read. The pivotal mounting of the side labelholder 12 may extend over almost all of the side face 5 of the terminal strip which makes it possible to uncover the ground contact 24 when a screened cable drain wire has to be connected to it. To connect a connector 10 and cable 11 to the contacts 3 of the terminal strip the labelholder 13 is either raised and left in the raised position or removed, in which case the terminal strip 1 is still identified by the side labelholder 12.

The side labelholder 12 may be replaced with a fixed side labelholder 17 shown in FIG. 6. The labelholder 17 of FIG. 6 is a generally channel shaped section bar of transparent plastics material that is substantially complementary in shape to the bosses 14 and which can fit over said bosses 14, having a rib 18 adapted to snap into the notches 19 of the bosses 14. The labelholder 17 has an end face 28 that is substantially parallel to the side face 6 or possibly diverges from the side face towards the rear. The end face 28 is extended substantially at right angles towards the terminal strip by a rear branch 30 and slantwise towards the terminal strip and towards the front face by a front branch 27 ending at the rib 18 which is substantially parallel to the side face 5. The branch 27 may be joined to the end face 28 by a fillet 29 and the branch 27, may be substantially parallel to the front face of the terminal strip. The labelholder 17 may be relatively long, extending across the side faces 5 of a plurality of terminal strips 1 if a plurality of terminal strips need to have the same marking. The labelholder 17 includes a label 17a inside the channel section bar, bearing against the front branch 27 and the end face 28 of the channel section. The label 17a is retained by internal beads 25, 26. As previously, the label 17a is relatively easy to read from in front face of the terminal strip 1.

The terminal strip in accordance with the invention could also have two pivoting side labelholders 12, or two fixed side labelholders 17 on both its two side faces.

The front labelholder 13 described above could advantageously close off the front face of the terminal strip in a substantially watertight way, for example to prevent water vapor reaching the contacts 3.

I claim:

1. A terminal strip having two substantially rectangular, generally planar sides, two side faces, a front face and a back face, said terminal strip being adapted to be fixed to a rail by said back face, said sides being perpendicular to the length of said rail, said front face including electrical contacts, said terminal strip including a side labelholder extending over a side face and making an obtuse angle with the front face so that a label carried by said labelholder is visible from the front face of the terminal strip, wherein the side labelholder comprises snap-fastener means at one of its ends cooperating with a snap-fastener member on the front face at one of its ends near the side face for removable mounting of said labelholder on the terminal strip.

2. A terminal strip according to claim 1, wherein the side labelholder substantially covers said side face and pivots about an axis near the front face and perpendicular to the sides of the terminal strip.

3. A terminal strip according to claim 1, comprising identical snap-fastener members at both ends of its front face near the side faces and a front face labelholder covering the front face of the terminal strip and having snap-fastener means cooperating with one of the snap-fastener members to mount the front face labelholder removably to the terminal strip.

4. A terminal strip according to claim 3, wherein the snap-fastener means of the front face labelholder cooperate with one of the snap-fastener members to mount the front labelholder so that it pivots about an axis perpendicular to the sides of the terminal strip.

5. A terminal strip according to claim 1, wherein said snap-fastener member comprises two identical bosses each in the form of a plate extending parallel to the sides of the terminal strip, said bosses forming a bearing on which a front labelholder or said side labelholder is pivoted.

6. A terminal strip according to claim 5, wherein each side boss is elastically deformable perpendicularly to the sides of the terminal strip and has a hole for receiving a pivot snap-fastener on the front labelholder or on said side labelholder.

7. A terminal strip according to claim 3, wherein said front labelholder closes off the front face of the terminal strip in a substantially watertight manner.

8. A terminal strip according to claim 1, wherein said side labelholder is a generally channel shaped section bar, the terminal strip comprising a complementary-shaped side boss on at least one side face near the front face, said side labelholder being snap-fastened to said side boss and extending perpendicularly to the sides of the terminal strip beyond at least one side.

9. A terminal strip according to claim 8, wherein said side boss comprises a notch perpendicular to the sides of the terminal strip and said side labelholder has a complementary rib snap-fastened in said notch.

10. A terminal strip according to claim 8, wherein said side labelholder is transparent.

11. A terminal strip according to claim 10, further comprising a label retained in said side labelholder by internal beads.

* * * * *